United States Patent [19]

Leach

[11] 4,313,976

[45] Feb. 2, 1982

[54] COMPOSITION AND PROCESS FOR COLORING AND PRESERVING WOOD

[75] Inventor: Robert M. Leach, Grand Island, N.Y.

[73] Assignee: Osmose Wood Preserving Co. of America, Inc., Buffalo, N.Y.

[21] Appl. No.: 159,196

[22] Filed: Jun. 13, 1980

Related U.S. Application Data

[63] Continuation-in-part of Ser. No. 73,518, Sep. 7, 1979, abandoned.

[51] Int. Cl.$^3$ .......................... B05D 1/18; B05D 3/00; C09D 5/16; C09D 5/18
[52] U.S. Cl. .................. 427/297; 106/18.33; 106/18.36; 427/440
[58] Field of Search .................. 427/297, 397, 440; 106/18.33, 18.36

[56] References Cited

U.S. PATENT DOCUMENTS

| | | | |
|---|---|---|---|
| 1,777,235 | 9/1930 | Steinherz | 427/440 |
| 2,382,374 | 8/1945 | Wood | 427/397 |
| 2,976,183 | 3/1961 | Arthur | 427/397 X |
| 3,080,212 | 3/1963 | Oberley et al. | 427/440 X |
| 3,200,003 | 8/1965 | Bescher | 427/440 X |

FOREIGN PATENT DOCUMENTS 756685  9/1956  United Kingdom ............... 427/397

*Primary Examiner*—Michael R. Lusignan
*Attorney, Agent, or Firm*—Christel, Bean & Linihan

[57] ABSTRACT

Method and composition for simultaneously coloring and preserving wood by a single application of a contacting solution comprising any one of several known water soluble chemical preservatives containing any or all of the following heavy metals: copper, chromium and zinc, to which preservative solution has been added one or more specific naphthalene or benzene derivative compounds having hydroxy, amino or sulfonic acid functional groups attached to a ring carbon atom. Without departing from the teachings of this invention the wood may first be treated with the preservative solution and then contacted with the benzene or naphthalene derivative compound. It is also possible to apply the benzene or naphthalene derivative to the wood initially, followed by the application of the preservative solution.

41 Claims, No Drawings

COMPOSITION AND PROCESS FOR COLORING AND PRESERVING WOOD

CROSS-REFERENCE TO RELATED APPLICATION

This application is a continuation-in-part of application Ser. No. 73,518, filed Sept. 7, 1979, now abandoned.

BACKGROUND OF THE INVENTION

This invention relates to a composition and method for both coloring wood to enhance the aesthetic appearance of the grain, and for preserving wood against various destructive organisms or environmental agents responsible for rot and decay. More particularly, this invention relates to a composition and method whereby the coloring and preserving of the wood may be accomplished simultaneously, in a single application, or sequentially, in two separate applications which may be performed in either order.

It has long been desirable to produce wood products that are artistically and aesthetically acceptable to the public, yet preserved from the destructive agencies of wood. Wood that is colored and preserved is desirable for the home, and is used in the siding, fencing, and decking industry. Unfortunately, many of the preservative solutions used to preserve wood from wood destroying organisms impart their own color to the wood. In many cases the coloration imparted by the preserving solution is undesirable for one reason or the other.

One technique currently used to color wood is to paint the wood with an oil base paint or pigmented coating. Depending on the type of preservative used, some of the coatings will not adhere to the wood, resulting in blistering or flaking in a short period of time. Conventional petroleum based preservatives, such as creosote or pentachlorophenol pose problems because of oily films left on the treated wood, which may require several months to season, and even after such seasoning, it still may be difficult for paint or stain to penetrate the oily residue left behind. Water based preservatives are more desirable than conventional petroleum based preservatives because the wood is not coated with a film and can be readily painted or stained after treatment. However, coloration is only imparted at the surface of the wood with these techniques, resulting in limited permanence to weathering.

Alternatively, the wood may be precoated with a coloring agent such as an oil base or latex paint followed by treatment with the wood preservative. Many of the oil base paints or latex paints will form a coating on the wood which reduces or eliminates the penetration of the preservative into the wood. In many cases, the coatings and preservatives are incompatible with one another.

Many conventional processes are available for coloring and staining wood, while several processes are available to preserve wood from the various wood destroying organisms. Yet very few satisfactory methods are available to color and preserve the wood simultaneously. The processes that are available are less than desirable because many are multistepped operations. Many conventional processes provide only a surface coloration which will scratch or wear away and require additional treatment or servicing for exposure to long term weathering.

In view of the many shortcomings applicable to the current methods of coloring and preserving wood, it is desirable to have a process which is not only capable of coloring and preserving the wood by a single operation, but also results in the penetration of the color into the wood to provide for long term application and stability.

SUMMARY OF THE INVENTION

It is the object of this invention to provide a composition and method for preserving wood from deterioration by decay and insects, which may also simultaneously color the wood in a single application.

A further object of this invention is to provide a method of selectively coloring the wood in such a way that the color highlights the grain tones of the wood.

A further object of this invention is to provide a method of impregnating the color beneath the surface of the wood to provide for long term application.

Still another object of this invention is to provide a method for imparting color to wood which results in the appearance of uniform color on the surface of the wood.

In accordance with the present invention there is provided a water soluble preservative solution containing any one of several known chemical preservative compositions with the proviso that the preservative selected contain any or all of the following heavy metals: copper, chromium, and zinc. To this preservative solution is added a specific naphthalene or benzene derivative compound having at least one sulfonyl group, at least one hydroxyl or amino group, and up to two additional groups selected from the group consisting of sulfonyl, hydroxyl and amino, causing a color to develop in the preservative solution, which, depending upon the specific derivative added and the metal ion present in the preservative, can selectively vary the color of the solution from red to brown.

Naphthalene and benzene derivatives are known in the coloring industry as intermediate compounds useful in the manufacture of complex organic dyes. However, the use of these compounds in combination with heavy metal wood preservative compositions to impart wood coloring capability directly to the preservative composition, is believed to be a totally new discovery in the art.

The exact mechanism of action which is responsible for the color development which occurs when the preservative composition reacts with the benzene or naphthalene derivative compound, is unknown. Color development may occur through three basic mechanisms:

(1) Formation of a salt between the metal atom and the organic species.

(2) Reaction of the metal with the organic species, for example, oxidation or reduction.

(3) Formation of a complex between the metal atom and the organic species through chelation.

It is believed that the third mechanism is responsible for the color development in this particular system. Copper and chromium belong to a group of elements called the transition metals. These elements are capable of forming a complex with certain organic compounds containing oxygen, sulfur and nitrogen. Zinc although not a transition metal is capable of forming a complex species with certain organic compounds containing oxygen, sulfur and nitrogen. The chelation mechanism for each compound and class of compounds will vary depending on the number of organic complexing agents present and also the amount of impurities present.

Therefore, it is hypothesized that when the benzene or naphthalene derivative is allowed to react with the metal containing preservative solution, a complexed metal species or ion is formed imparting color to the mixture. When wood is thereafter treated with this complex-preservative mixture or solution according to conventional wood treatment cycles employing for example, either the Full Cell or Empty Cell process, both the preservative and the attached color developing ion complex are simultaneously carried beneath the surface of the wood to thereby impart long lasting color to the wood. In this manner the color and preservative are applied simultaneously in a single step operation.

DETAILED DESCRIPTION OF THE INVENTION

Wood is simultaneously colored and preserved by the application of a solution of a known water soluble preservative containing any or all of the following heavy metals: copper, chromium, and zinc, to which solution has been added a benzene or naphthalene derivative compound having hydroxy, amino or sulfonic acid functional groups attached to a ring carbon atom, in any combination. Each functional group may be attached to any ring carbon atom in any position along the benzene or naphthalene ring, but only one functional group may be attached to any single carbon atom. The salts of these compounds can also be used, and in fact are preferred because of their increased solubility in aqueous systems.

It has been established that benzene based derivatives are operative in the practice of the invention but are not commercially important. Phenol and resorcinol, for example, have inherent water solubility but will yield a weak color complex which will precipitate rapidly out of solution.

It is the naphthalene derivative compounds which are preferred and are the most commercially important. Although a naphthalene derivative will be operative without the presence of a sulfonyl group on the ring, it will not have sufficient stability to render the compound commercially useful. 5-Amino-1-naphthol is an example of one such unstable compound. Therefore, in order for a naphthalene compound to be suitable for commercial use, the compound must have at least one sulfonyl group attached to the ring to render the compound sufficiently soluble in the preservative system. It is preferred that there be at least two sulfonyl groups present to give the composition the desired long term stability.

Also important to commercial success is the presence of at least one hydroxyl or amino group on the ring, in addition to the sulfonyl group. The presence of the amino or hydroxyl group is essential to intense color development owing to formation of complexes between the benzene or naphthalene derivative and the heavy metal. It is preferred to have two hydroxyl groups, two amino groups or one hydroxyl and one amino group for particularly intense color development.

In summary, the compounds, the salts of which are of particular value in the practice of this invention, are those naphthalene derivative compounds having at least one sulfonyl group, at least one hydroxyl or amino group, and up to two additional groups selected from the group consisting of sulfonyl, hydroxyl and amino, said groups attached at any position around the naphthalene ring. It is desirable to have three different functional groups attached to the ring; however, it is not necessary to have all three present for good color development.

Examples of naphthalene compounds which are particularly suitable for carrying out the method of this invention are: 1,7-dihydroxynaphthalene-3,6-disulfonic acid; 2-amino-7-hydroxynaphthalene-5-sulfonic acid; 7-amino-1,3-naphthalene disulfonic acid; 3-amino-2,7-naphthalene disulfonic acid; 1-amino-8-naphthol-2,4-disulfonic acid; 1-amino-2-naphthol-4-sulfonic acid; 2-amino-1-naphthalene sulfonic acid; 8-amino-1-naphthalene sulfonic acid; 6-amino-2-naphthalene sulfonic acid; 1-amino-8-naphthol-4,6-disulfonic acid; 1-naphthylamine-5-sulfonic acid; 4,5-dihydroxy-2,7-naphthalene disulfonic acid; 2,8-dihydroxy-6-naphthalene sulfonic acid; 2,7-diamino-7-naphthalene sulfonic acid; 1-naphthylamine-3,6-disulfonic acid; 8-amino-1-naphthol-3,6-disulfonic acid; and 1-naphthol-5-sulfonic acid; 1-naphthylamine-8-sulfonic acid.

Examples of water soluble preservative concentrate systems that can be used with the color complexing agents of this invention are:

(1) Acid Copper Chromate: containing about 28.0%–31.8% copper as copper oxide and about 63.3%–68.2% chromium as chromic acid.

(2) Chromated Copper Arsenate (CCA)—Types A, B and C: Type A containing about 16.0%–20.9% copper oxide, about 59.4%–69.3% chromium as chromic acid and about 14.7%–19.7% arsenic as arsenic pentoxide; Type B containing about 18.0%–22.0% copper as copper oxide, about 33.0%–38.0% chromium as chromic acid about 42.0%–48.0% arsenic as arsenic pentoxide; and Type C containing about 17.0%–21.0% copper as copper oxide, about 44.5%–50.5% chromium as chromic acid and about 30.0%–38.0% arsenic as arsenic pentoxide.

(3) Fluor-Chrome-Arsenate-Phenol: containing about 20.0%–24.0% fluoride, about 33.0%–41.0% chromium as chromic acid, about 22.0%–28.0% arsenic as arsenic pentoxide and 14.0%–18.0% dinitrolphenol.

(4) Chromated Zinc Chloride: containing about 19.0%–20.0% chromium as chromic acid and about 76.0%–80.0% zinc as zinc oxide.

(5) Tanalith C: containing about 18.9% copper as copper oxide, about 51.8% chromium as chromic acid, and about 29.3% arsenic as arsenic pentoxide.

(6) Copperized Chromated Zinc Arsenate: containing about 13.0% copper as copper oxide, about 20.3% chromium as chromic acid, about 11.5% zinc as zinc oxide and about 25.2% arsenic as arsenic pentoxide.

All of the chemical compositions and preservatives listed above are commercially available.

In carrying out the method of this invention, the color complexing derivatives of benzene or naphthalene may be prepared as an aqueous solution as a metal salt of sodium, potassium, etc. To increase the solubility of the complexing agent in water, it may be advantageous to increase the pH of the solution to pH 2 to 11 by the addition of a suitable base such as sodium hydroxide, with the preferred pH range between 8 and 10.

The aqueous salt solution is then mixed with the water soluble preservative solution to obtain a final concentration of the naphthalene derivative ranging from 0.01% to 2.0% by weight depending upon the concentration of the metal present in the preservative solution. Concentrations above 2.0% may also be used, but due to economic considerations the 2% upper limit is presently preferred. The preferred final concentration of the preservative in solution is about 1% to 2% by weight, but concentrations ranging from 0.1% to 10.0% may also be employed.

Temperature and pressure parameters are not critical to carrying out this invention. A fairly wide temperature range may be employed, with the upper limit at about 150° F. The lower limit should be sufficiently warm to prevent the solution from freezing.

Upon the addition of the salt solution of complexing agent to the preservative solution, the pH of the final solution should be maintained between 0.5-3.0, and preferably between 1.5-2.0, by the addition of acid such as sulfuric, phosphoric, etc.

The color imparted to the wood can be varied from brown to red or some suitable shade therebetween, depending upon the particular combination of naphthalene derivative complexing agents employed, and their concentration. One or more complexing agents may be mixed or blended with the preservative in order to obtain the desired degree of coloration. The particular metal or combination of metals present in the preservative solution will also influence the final coloration imparted to the wood.

After the complexing agent has been added to the preservative, and a sufficient period of time has elapsed to allow for color development, the wood is treated. Color development usually occurs within 1 to 3 hours, however, depending upon the particular metal or metals present in the preservative and the particular derivative used, the time for color development may be 12 hours or longer.

The treating solution may be applied to the wood by dipping, soaking, spraying, brushing etc. However, vacuum and/or pressure treatment techniques are preferred. Any known vacuum and/or pressure technique may be used to impregnate the wood according to the method of this invention, including both the "Empty Cell" process and the "Full Cell" process which are well known to those skilled in the art.

The "Full Cell," or Bethell, process is employed in the creosoting of railway sleepers and marine timbers and is the normal method of treatment of any class of timber with water-borne preservatives, and may be used with the treating solution of the invention. It has been in continuous use since 1838 and consists of first subjecting the timber in a cylinder to a vacuum up to 28 inches for ½ to 1 hour, then filling the cylinder with the treating solution and applying a pressure of up to 180-200 lbs. per square inch until the required amount of treating solution has been injected into the timber. The cylinder is then emptied of treating solution and the treated timber optionally subjected to a short final vacuum to clean up the surface of the timber. It is usual to heat the treating solution throughout the treatment, e.g., to a temperature of 150°-200° F., as penetration is better when hot. As in all pressure processes the pressure period is by far the most important factor affecting the amount and depth of impregnation. In practice it is the magnitude and duration of the pressure that governs the absorption of the treating solution by the timber. In the early stages of the pressure period the absorption by the timber is fairly uniform but then it gradually slows down until the absorption is too slow to be readily observed. When this point is reached the timber is said to have been treated to refusal. The rate of absorption varies greatly with different species, and timbers such as beech or Coriscan pine will be completely impregnated in a few minutes while others like Douglas fir, larch or oak heartwood are not completely penetrated even when under pressure for several days.

The "Empty Cell" treatment, using an initial air pressure, is also known as the Rueping Process and is the standard method for the creosoting of transmission poles. It is also used for wood paving blocks, fencing, and building timbers, and may be used with the treatment solution of the invention. The treating schedules aim at obtaining complete penetration of any sapwood present. The Rueping treatment was introduced about 1912 and differs from the full cell method in that the timber is initially subjected to compressed air instead of a vacuum. The cylinder is then filled with the treating solution while maintaining this pressure, and pressure is then increased with a hydraulic pump until the desired amount of treating solution is injected into the timber. The pressure is then released and the air compressed in the interior of the timber is allowed to escape and in so doing expels the excess liquid, leaving the cell walls coated with treating solution. This method of treatment allows a deep impregnation of the timber without a heavy absorption. The compression of the air originally in the wood serves to recover a small amount of the injected treating solution when the pressure is released. A long final vacuum is also used to assist in this.

Before impregnating timber with any wood treating solution it is essential to season it first until at least all the free water has been removed from the cell spaces. This stage of seasoning represents a moisture content of about 25-30%, varying slightly with different species. There are two very good reasons for this: first, it is not possible to inject another liquid into wood containing much water, and second, splits developing as the result of the subsequent drying of the timber would almost certainly expose untreated timber. It is also desirable to carry out all cutting, machining and boring, etc., of the timber before treatment is applied, as all these operations, if carried out after treatment, would expose untreated wood. Where these operations cannot be done until after treatment all exposed untreated timber should be given a liberal application of treating solution, and holes preferably treated with a pressure bolt-hole treater.

It is preferable to color and preserve the wood simultaneously, however, in certain instances it may be desirable to treat and color the wood in two stages. Without departing from the teachings of this invention the wood may first be treated with the preservative solution and then contacted with the complexing agent. Its is also possible to apply the complexing agent to the wood initially, followed by the application of the preservative solution.

Here again, however, it is preferred that the application process be carried out using any known conventional vacuum and/or pressure technique.

The following examples will serve to further illustrate the invention.

EXAMPLE I

Southern Yellow Pine, (measuring 2"×6"×4') was simultaneously colored and preserved by the Full Cell treatment using a 1.24% CCA-C solution containing 0.59% chromic acid, 0.22% copper oxide and 0.42% arsenic pentoxide, and 0.12% 4,5-dihydroxy-2,7-naphthalene disulfonic acid. The system was allowed to react for three hours and the pH maintained at 1.8 by the addition of sulfuric acid. The wood was initially placed under a vacuum of 30" Hg for 30 minutes followed by the addition of the treating solution. The system was then pressurized for 30 minutes at a pressure of 110 lbs. per square inch. The resulting wood, when dried, was colored brown and was also protected against wood destroying organisms.

EXAMPLE II

Douglas-fir blocks (1½"×2"×6") were simultaneously colored and preserved utilizing the Lowry Empty Cell process using a 0.8% CCA-B treating solution containing 0.28% chromic acid, 0.14% copper oxide, 0.3% arsenic pentoxide and 0.6% 7-amino-1,3-naphthalene disulfonic acid monosodium salt. The resulting wood was air dried to a 20% moisture content and was colored a light brown.

EXAMPLE III

To 100 grams of water 0.45 grams of 4,5-dihydroxy-2,7-naphthalene disulfonic acid and 0.45 grams of 8-amino-1-naphthol-3,6-disulfonic acid sodium salt were added and the pH of the solution raised from 2.7 to 10.0 with 20% sodium hydroxide to increase the solubility. The intensity of color appears to be influenced by the ratio of these two derivatives. While no particular ratio is critical, a mixture of about 15–70% of 4,5-dihydroxy-2,7-naphtalene disulfonic acid and about 85–30% of 8-amino-1-naphthol-3,6-disulfonic acid sodium salt is particularly effective.

This solution was then added to 900 grams of a 1.0% preservative solution containing 0.16% chromium as potassium dichromate, 0.17% copper as copper sulfate and 0.11% arsenic as arsenic pentoxide dihydrate, and the pH maintained at 1.8 with sulfuric acid. After 1½ hours of reaction, Western Hemlock was treated using the Full Cell process. The resulting wood was oven dried at 120° F. and was colored a dark brown throughout.

EXAMPLE IV

Southern Yellow Pine blocks (⅜"×2"×6") were simultaneously colored and preserved using the Full Cell treatment with a solution containing 2-amino-7-hydroxynaphthalene-5-sulfonic acid monosodium salt and 4,5-dihydroxy-2,7-naphthalene disulfonic acid disodium salt in a 1.2% CCA-C solution.

Prior to treatment, 0.25 grams of 2-amino-7-hydroxynaphthalene-5-sulfonic acid and 0.25 grams of 4,5-dihydroxy-2,7-naphthalene disulfonic acid were dissolved in 100 grams of water. The pH was adjusted to 7.0 with 10% sodium hydroxide. Four grams of 50% CCA-C were added to the solution and the pH adjusted to 1.0 with sulfuric acid. The mixture was allowed to react for 1½ hours prior to treatment of the Southern Yellow Pine. The Southern Yellow Pine blocks were placed in a cylinder and a vacuum of 30" Hg applied for 15 minutes, the treating solution was then added to the cylinder and the system pressurized to 100 lbs. per square inch for 30 minutes. The resulting wood, when dried, was colored a light brown and was also protected against wood destroying organisms.

EXAMPLE V

Southern Yellow Pine blocks were colored a light brown color with a solution containing 1,7-dihydroxynaphthalene-3,6-disulfonic acid dipotassium salt in a 1.5% CCA-C solution using the Full Cell process. Initially, 0.5 grams of 1,7-dihydroxynaphtalene-3,6 disulfonic acid dipotassium salt were dissolved in 100 grams of water. After the dissolution of the organic complexing agent, 3 grams of 50% CCA-C were added to the solution and the pH adjusted to 1.7 with concentrated sulfuric acid. The solution was allowed to react for 2½ hours and the pH maintained at 1.7 with sulfuric acid prior to treatment of the Southern Yellow Pine.

A variety of woods can be colored and preserved in accordance with this invention including hard and/or soft woods. Any type of wood may be thus simultaneously colored and preserved provided it is capable of withstanding conventional wood treatment processes.

Wood colored and preserved according to the method of this invention resists weathering and has many uses in the construction industry. Patio and pool decks, wood siding and beams, fence posts, garden ties and poles for outdoor or indoor use are just a few of the possible products which may incorporate wood treated according to the method described herein.

It is to be fully understood that all of the foregoing examples are intended to be merely illustrative and not to be construed or interpreted as being restrictive or otherwise limiting of the present invention, excepting as set forth and defined in the hereto appended claims.

What is claimed is:

1. A method for treating wood which simultaneously preserves the wood against wood destroying organisms and selectively colors the wood which comprises contacting the wood with an aqueous solution comprising: (a) a water soluble wood preservative containing any or all of the following heavy metals: copper, chromium, and zinc, and (b) one or more water soluble naphthalene derivatives having at least one sulfonyl group, at least one hydroxyl or amino group, and up to two additional groups selected from the group consisting of sulfonyl, hydroxyl and amino, wherein said groups are attached at any position around the naphthalene ring and the total number of said groups is not greater than 4.

2. The method of claim 1 wherein at least two of the groups are sulfonyl groups.

3. The method of claim 1 wherein a salt of said naphthalene derivative is used.

4. The method of claim 1 or 3 wherein the final concentration of said preservative is between about 0.1% and 10.0% by weight.

5. The method of claim 4 wherein the final concentration of said naphthalene derivative is between about 0.01% and 2.0% by weight.

6. The method of claim 5 wherein the pH of the aqueous solution is maintained between about 0.5 to 3.0 by the addition of a sufficient quantity of a suitable acid.

7. The method of claim 5 wherein the pH of the aqueous solution is maintained between about 1.5 to 2.0 by the addition of a sufficient quantity of a suitable acid.

8. The method of claim 6 wherein the method imparts a brown color to the wood.

9. The method of claim 6 wherein the method imparts a red color to the wood.

10. The method of claim 6 wherein the water soluble preservative is CCA-Type C containing about 17.0%–21.0% copper as copper oxide, about 44.5%–50.5% chromium as chromic acid and about 30.0%–38.0% arsenic as arsenic pentoxide, and the water soluble naphthalene derivative is 4,5-dihydroxy-2,7-naphthalene disulfonic acid.

11. The method of claim 6 wherein the water soluble preservative is CCA-Type C containing about 17.0%–21.0% copper as copper oxide, about 44.5%–50.5% chromium as chromic acid and about 30.0%–38.0% arsenic as arsenic pentoxide, and the water soluble naphthalene derivative is 8-amino-1-naphthol-3,6-disulfonic acid sodium salt.

12. The method of claim 6 wherein the naphthalene derivatives comprise a mixture of 4,5-dihydroxy-2,7-naphthalene disulfonic acid and 8-amino-1-naphthol-3,6-disulfonic acid sodium salt and the water soluble preservative is CCA-Type C containing about 17.0%–21.0% copper as copper oxide, about 44.5%–50.5% chromium as chromic acid and about 30.0%–38.0% arsenic as arsenic pentoxide.

13. The method of claim 12 wherein the mixture comprises about 15–70% of 4,5-dihydroxy-2,7-naphthalene disulfonic acid and about 85–30% of 8-amino-1-naphthol-3,6-disulfonic acid sodium salt.

14. A composition for simultaneously preserving wood against wood destroying organisms and selectively coloring the wood, which comprises an aqueous solution of:
(a) a water soluble wood preservative containing any or all of the following heavy metals: copper, chromium, and zinc, and (b) one or more water soluble naphthalene derivatives having at least one sulfonyl group, at least one hydroxyl or amino group, and up to two additional groups selected from the group consisting of sulfonyl, hydroxyl and amino, wherein said groups are attached at any position around the naphthalene ring and the total number of said groups is not greater than 4.

15. The composition of claim 14 wherein at least two of the groups are sulfonyl groups.

16. The composition of claim 14 wherein a salt of said naphthalene derivative is used.

17. The composition of claim 14 or 16 wherein the final concentration of said preservative is between about 0.1% and 10.0% by weight.

18. The composition of claim 17 wherein the final concentration of said naphthalene derivative is between about 0.01% and 2.0% by weight.

19. The composition of claim 18 wherein the pH of the aqueous solution is maintained between about 0.5 to 3.0 by the addition of a sufficient quantity of a suitable acid.

20. The composition of claim 18 wherein the pH of the aqueous solution is maintained between about 1.5 to 2.0 by the addition of a suitable acid.

21. The composition of claim 19 which imparts a red color to the wood.

22. The composition of claim 19 which imparts a brown color to the wood.

23. The composition of claim 19 wherein the water soluble preservative is CCA-Type C, containing about 17.0%–21.0% copper as copper oxide, about 44.5%–50.5% chromium as chromic acid and about 30.0%–38.0% arsenic as arsenic pentoxide, and the water soluble naphthalene derivative is 4,5-dihydroxy-2,7-naphthalene disulfonic acid.

24. The composition of claim 19 wherein the water soluble preservative is CCA-Type C, containing about 17.0%–21.0% copper as copper oxide, about 44.5%–50.5% chromium as chromic acid and about 30.0%–38.0% arsenic as arsenic pentoxide, and the water soluble naphthalene derivative is 8-amino-1-naphthol-3,6-disulfonic acid sodium salt.

25. The composition of claim 19 wherein the naphthalene derivatives comprise a mixture of 4,5-dihydroxy-2,7-naphthalene disulfonic acid and 8-amino-1-naphthol-3,6 disulfonic acid sodium salt and the water soluble preservative is CCA-Type C containing about 17.0%–21.0% copper as copper oxide, about 44.5%–50.5% chromium as chromic acid and about 30.0%–38.0% arsenic as arsenic pentoxide.

26. The composition of claim 25 wherein the mixture comprises about 15–70% of 4,5-dihydroxy-2,7-naphthalene disulfonic acid and about 85–30% of 8-amino-1-naphthol-3,6-disulfonic acid sodium salt.

27. A method for treating wood which imparts color to the wood and preserves the wood from wood destroying organisms, comprising:
(a) first, contacting the wood surface with an aqueous derivative solution comprising one or more water soluble naphthalene derivatives having at least one sulfonyl group, at least one hydroxyl or amino group, and up to two additional groups selected from the group consisting of sulfonyl, hydroxyl and amino, wherein said groups are attached at any position around the naphthalene ring and the total number of said groups is not greater than 4, and
(b) second, contacting the wood surface with an aqueous preservative solution comprising a water soluble preservative containing any or all of the following heavy metals: copper, chromium and zinc.

28. The method of claim 27 wherein at least two of the groups are sulfonyl groups.

29. The method of claim 27 wherein a salt of said naphthalene derivative is used to make the derivative solution.

30. The method of claim 27 or 29 wherein the concentration of the preservative in said preservative solution is between about 0.1% and 10.0% by weight.

31. The method of claim 30 wherein the concentration of the naphthalene derivative in said derivative solution is between about 0.01% and 2.0% by weight.

32. The method of claim 31 wherein the pH of said derivative solution is maintained between 2.0 and 11.0.

33. A method for treating wood which imparts color to the wood and preserves the wood from wood destroying organisms comprising:
(a) first, contacting the wood surface with an aqueous preservative solution of a water soluble preservative containing any or all of the following heavy metals: copper, chromium and zinc, and
(b) second, contacting the wood surface with an aqueous derivative solution of one or more water soluble naphthalene derivatives having at least one sulfonyl group, at least one hydroxyl or amino group, and up to two additional groups selected from the group consisting of sulfonyl, hydroxyl and amino, wherein said groups are attached at any position around the naphthalene ring and the total number of said groups is not greater than 4.

34. The method of claim 33 wherein at least two of the groups are sulfonyl groups.

35. The method of claim 33 wherein a salt of said naphthalene derivative is used to make the derivative solution.

36. The method of claim 33 or 35 wherein the concentration of said preservative in the preservative solution is between about 0.1% and 10.0% by weight.

37. The method of claim 36 wherein the concentration of said naphthalene derivative in the derivative solution is between about 0.01% and 2.0% by weight.

38. The method of claim 37 wherein the pH of said derivative solution is maintained between 2.0 and 11.0.

39. The method of claim 6 wherein the aqueous solution is applied to the wood by a vacuum/pressure process, followed by drying the wood to a moisture content of about 20% or less.

40. The method of claim 6 wherein the aqueous solution is applied to the wood using the full cell process.

41. The method of claim 6 wherein the aqueous solution is applied to the wood using the empty cell process.

* * * * *